Patented July 23, 1935

2,009,136

UNITED STATES PATENT OFFICE 2,009,136

CHEESE TYPE SPREAD OF BUTTERLIKE CONSISTENCY

William P. M. Grelck, Baltimore, Md.

No Drawing. Application May 29, 1934, Serial No. 728,152

3 Claims. (Cl. 99—11)

My invention relates to a cheese type spread of butterlike consistency, by combining an acid milk food product, as described in my application for U. S. Letters Patent filed March 5, 1934 under Serial No. 714,203, with a quantity of cured or fully ripened cheese or cheese of the hard cheese type or with Camembert cheese or other cured cheese of the soft cheese type, for the purpose of imparting to the finished product a distinct flavor and aroma of the ripened cheese or a combination of ripened cheeses. By cured or ripened cheese I refer to cheese which passes or has passed through a mycological process which has changed the fresh complexed proteins into soluble simple proteins through the action of bacteria enzymes and yeasts. Instead of ripened cheese, preserved fruits, relishes or the like may be used.

The object of my invention is to produce an acid milk food product of butterlike consistency from skimmed milk, buttermilk, whole milk, whole milk enriched with butterfat, cream or reconstituted milk or cream, treating the same as fully described in my application for U. S. Letters Patent filed March 5, 1934 under Serial No. 714,203, of semisolid consistency, having its casein and albumen content in minutely divided particles of soft body and texture and its serum practically free from albumen, then adding to the same a quantity of well cured or ripened cheese for the purpose of imparting to the finished product a distinct cheese flavor. Cheddar cheese, Camembert cheese, Roquefort cheese, Limburger cheese or any other cured hard or soft cheese of distinct characteristic flavor or a combination of such cheeses may be used in such quantities so as to impart to the finished product the flavor of the cured cheese or cheeses used, or in place of cheeses a proper quantity of preserved fruits, fresh fruits, relishes or the like may be used.

The previously prepared food product and the proper quantity of crushed cheese or cheeses, or fruit or relishes are placed in a mixing kettle fitted with steam jacket and stirrer, any other suitable device may be used. The mass is then heated, while simultaneously agitated, to pasteurizing temperature, it may then be homogenized if desired by passing the same through a homogenizing device; it may then, while hot, be filled in suitable containers or it may be cooled and then packed for human consumption.

In practicing my invention I prefer to proceed as follows: For example, to make an acid milk food product of semisolid consistency, rich in butterfat and containing all of the original milk constituents of the milk or cream material used, I take 250 lbs. of 16% cream which has a total solid content of about 24%. The cream is put into a steam jacketed forewarmer fitted with an agitator, or into other suitable apparatus, and heated to the boiling point or to about 210 degrees to 212 degrees Fahrenheit. The so treated cream is left to remain for from 10 to 20 minutes at this temperature to cause practically all of its albumen to coagulate; this is the first step of my process. The second step consists in homogenizing the so treated cream while hot (however homogenization is not necessary at this stage of the process) and then cooling the same to the desired ripening temperature of about 75 degrees Fahrenheit. The third step consists in adding from 3 to 10 lbs. of previously prepared starter containing suitable lactic acid bacteria. It is now fermented until from about 0.4% to 0.6% lactic acid is obtained. The mass is at this stage in the form of a clabber or soft liver-like coagulum, containing the coagulated albumen and casein. Now as the fourth step of my process, the coagulum is broken up into minutely divided, fixed, and non-adherent particles, which are of soft body and texture, by agitating and simultaneously heating the same to pasteurizing temperature or higher. Coagulating the albumen in the fresh milk or cream material previous to fermenting the same, is necessary to produce a coagulum consisting of both the albumen and casein and this is an essential feature of my process to produce milk protein particles of minutely divided, fixed, and non-adherent form of soft body and texture. The serum of the so treated cream is practically free from non-coagulated albumen and casein and contains practically only mineral matter, lactic acid and sugar of milk in solution. The fifth step consists in removing about 150 lbs. of surplus fluid or moisture in vacuo or other suitable evaporating apparatus, so that the finished product is reduced to about ⅖ or 100 lbs. of its original volume by weight and is of semisolid consistency; it contains about 60% total solids of which 40% is butterfat. The sixth step consists in combining or intermingling with it cured cheese like Cheddar cheese, Swiss cheese, Roquefort cheese, Camembert cheese or other cured cheeses of the hard or soft cheese type, in the following manner: The 100 lbs. of finished product obtained as herein described, are placed in a steam jacketed kettle fitted with suitable stirrer, agitated and kept at a temperature of about 100 degrees Fahrenheit. Now I add gradually about 60 lbs. of crushed cured Cheddar cheese while the mass is being agitated and kept at about 100 degrees Fahrenheit. When all of the Cheddar cheese is added, the mass is heated, while agitated, to pasteurizing temperature and may then be passed through a homogenizer and then filled into suitable containers while hot or it may be cooled and cut into blocks. It is now ready for human consumption. The butterfat content of the fresh milk material treated may vary according to the butterfat content desired in the finished product. The amount or proportion of cheese or cheeses however may vary. The addition of cured cheese or cheeses may be eliminated and in its place from 10 to 30 lbs. of preserved fruit or fresh fruit or relishes or sweet pimento or similar foodstuffs may be used.

What I claim as new is:

1. The process of producing an acid milk food product of butterlike consistency, practically free from non-coagulated albumen and casein, from skimmed milk, buttermilk, part whole milk, whole milk, enriched milk, cream or reconstituted milk or cream, which consists in coagulating practically all of its albumen by the agency of heat previous to souring or fermenting the same, then fermenting the same to form a coagulum containing both the albumen and casein, then breaking up the coagulum by agitation and simultaneously heating the same to produce protein particles of minutely divided, fixed, and non-adherent form of soft body and texture and a serum free from non-coagulated albumen and casein, then evaporating the surplus moisture or fluid, then adding a sufficient amount of cured cheese or cheeses for the purpose of imparting the characteristic flavor of the cured cheese or cheeses added to the mass, agitating while heating the mixture to pasteurizing temperature, then homogenizing the same, then packing the same in suitable containers.

2. The process of producing an acid milk food product of butterlike consistency, practically free from non-coagulated albumen and casein, from skimmed milk, buttermilk, part whole milk, whole milk, enriched milk, cream or reconstituted milk or cream, which consists in coagulating practically all of its albumen by the agency of heat previous to souring or fermenting the same, then fermenting the same to form a coagulum containing both the albumen and casein, then breaking up the coagulum by agitation and simultaneously heating the same to produce protein particles of minutely divided, fixed, and non-adherent form of soft body and texture and a serum free from non-coagulated albumen and casein, then evaporating the surplus moisture or fluid, then adding a sufficient amount of fresh or preserved fruit material or relishes or peppers or the like for the purpose of imparting their characteristic flavor to the mass, agitating while heating the mixture to pasteurizing temperature, then packing the same in suitable containers.

3. An acid milk food product of butterlike consistency, flavored with cured cheese or cheeses or with preserved or fresh fruit material or relish material, with its albumen and casein content in the form of soft body and texture and containing a serum practically free from albumen.

WILLIAM P. M. GRELCK.